(12) United States Patent
Bean

(10) Patent No.: US 8,356,186 B1
(45) Date of Patent: Jan. 15, 2013

(54) DECRYPTION SYSTEM AND METHOD FOR REDUCING PROCESSING LATENCY OF STORED, ENCRYPTED INSTRUCTIONS

(75) Inventor: Reginald D. Bean, Center Point, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 563 days.

(21) Appl. No.: 12/571,816

(22) Filed: Oct. 1, 2009

(51) Int. Cl.
*G06F 21/00* (2006.01)
(52) U.S. Cl. .................................... 713/190; 713/189
(58) Field of Classification Search ........... 713/189–190
See application file for complete search history.

(56) References Cited

U.S. PATENT DOCUMENTS

| | | | |
|---|---|---|---|
| 7,716,496 B2 * | 5/2010 | Kaneda et al. | 713/193 |
| 2004/0025040 A1 * | 2/2004 | Aoki et al. | 713/193 |
| 2006/0062383 A1 * | 3/2006 | Kaneda et al. | 380/28 |

* cited by examiner

*Primary Examiner* — Philip Chea
*Assistant Examiner* — Ghazal Shehni
(74) *Attorney, Agent, or Firm* — Donna P. Suchy; Daniel M. Barbieri

(57) ABSTRACT

A present novel and non-trivial decryption system and methods are disclosed for reducing latency associated with the decryption and execution of stored, encrypted instructions. The system comprises a storage device, a processor, a controller, a key generator, a plurality of memory banks, a plurality of bus switches, and a combiner. Upon receiving a processor command, the controller changes the switch positions of a plurality of switches, where a first switch is operatively coupled to a key generator, a second switch to a combiner for performing a combinatory decryption process, and both switches to plurality of memory banks. When a partition is switched, the processor executes data of an instruction immediately upon completion of the combinatory decryption process using at least one character retrieved from one memory bank while the next decryption key is generated and loaded into another memory bank at the same time.

20 Claims, 4 Drawing Sheets

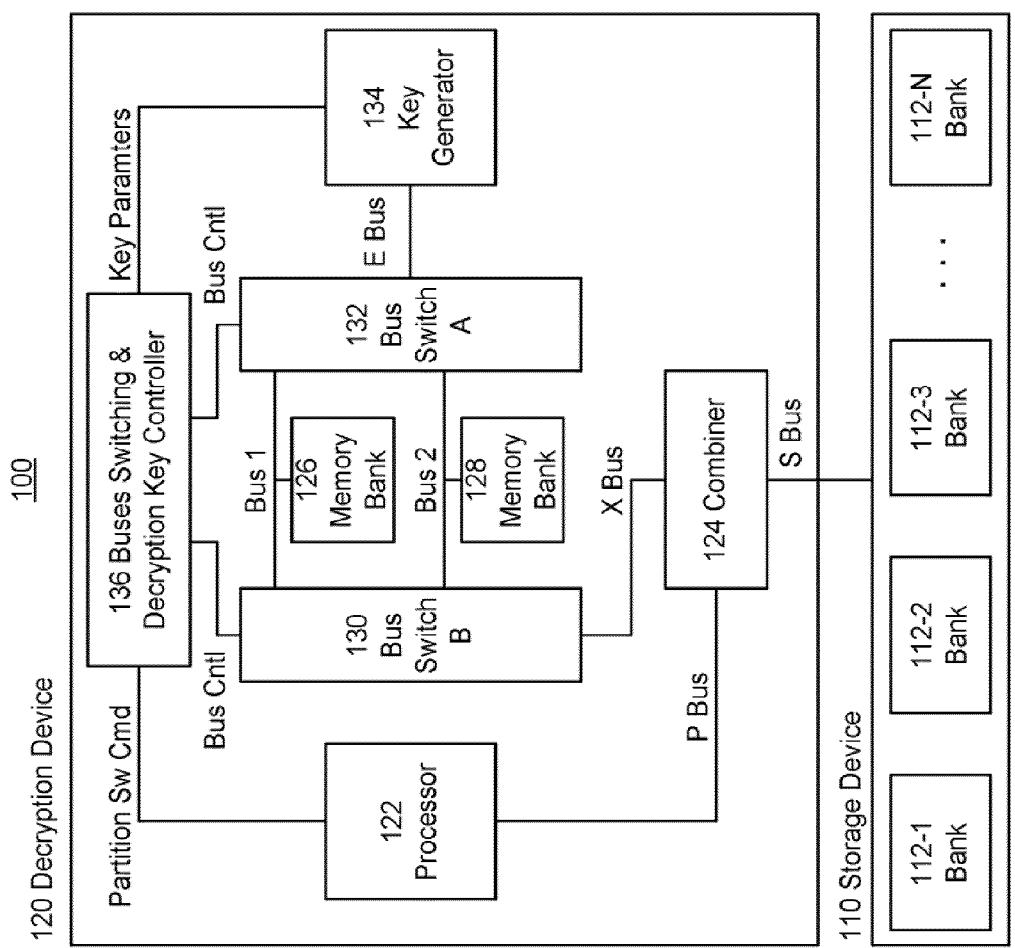

DECRYPTION SYSTEM AND METHOD FOR REDUCING PROCESSING LATENCY OF STORED, ENCRYPTED INSTRUCTIONS

BACKGROUND OF THE INVENTION

1. Field of the Invention

This invention pertains generally to the field of decrypting and executing code stored as encrypted instructions in a storage device.

2. Description of the Related Art

In a system where operational software is encrypted prior to execution, converting source code or instructions into executable form can be problematic. For example, one method comprises bulk decryption of the entire set of encrypted source code or instructions and storing the decrypted code into one or more memory banks; however, this requires a significant amount of onboard memory plus extended power-up latency.

In another example, a method could comprise the decrypting of blocks or sets of code or instructions as needed; however, this causes power inefficiencies due to unneeded code begin fetched and decrypted. In another example, a method could comprise a decryption "on the fly." While this method may address the non-usage of excess memory and inefficient power consumption of the two of the previous examples, it comes with an instruction by instruction latency due to the additional decryption processing that is not combinatorial in nature.

BRIEF SUMMARY OF THE INVENTION

A present novel and non-trivial decryption system and methods are disclosed for reducing latency associated with the decryption and execution of stored, encrypted instructions. The disclosures herein leverage the partition switching capability of a processor to provide decryption "on the fly" by decrypting each instruction of a set of encrypted instructions immediately upon decryption with a combinatorial process. With a plurality of memory banks, one memory bank may be previously-loaded with a decryption key while a second decryption key is being loaded in another memory bank. When a partition switch occurs, a decryption key may be retrieved from a memory bank and used in a decryption and execution process while the other memory bank may be simultaneously refreshed with the loading of a subsequent decryption key. The decryption and execution process is performed simultaneously or in parallel with and independently of the loading process. Latency incurred normally during a decryption process is eliminated while the use of memory is minimized. Also, a significant reduction in memory usage is realized.

In one embodiment, a decryption system for reducing processing latency of stored, encrypted instructions is disclosed. The system comprises a storage device, a processor, a controller, a key generator, a plurality of memory banks, a plurality of bus switches, and a combiner. The storage device is configured for storing a plurality of sets of encrypted instructions. The processor is configured or programmed to switch between a plurality of processor partitions, generate switch and read commands upon switching between partitions, and execute decrypted code. The controller is configured or programmed to receive switch commands, generate bus switch commands, and provide a plurality of sequential key parameters to a key generator. The key generator is configured or programmed to receive the plurality of sequential key parameters, generate a plurality of decryption keys, and load each decryption key into a memory bank via a first bus switch. Each memory bank is operatively coupled to both the key generator via the first bus switch and the combiner via the second bus switch. Bus switches configured or programmed to receive the bus switch commands from the controller and change the position of their respective switch such that one switch is operatively coupled to one memory bank and another switch is operatively coupled to a second memory bank. The combiner is configured or programmed to perform a decryption process on the code of each instruction of a set of encrypted instructions; then, the processor immediately executes the decrypted code. As embodied herein, the decryption process comprises a retrieval of code from a set of encrypted processor instructions, a retrieval of a decryption key from a memory bank via the second switch, and the decryption of the retrieved code using the decryption key.

In another embodiment, a decryption method for reducing processing latency of stored, encrypted instructions is disclosed. At least one key parameter is provided to a key generator. A first decryption key is generated and loaded into a memory bank via a first switch, where such decryption key correspond to the key parameter and comprises a plurality of decryption key characters. A first operation is performed, where the first operation comprises the changing of the positions of two switches, such that the memory bank from which at least one decryption key character is retrieved is not the same memory bank from the immediately preceding retrieval, and the memory bank into which a decryption key is loaded is not the same memory bank as the immediately preceding load. A second operation is performed, where the second operation comprises the executing of the code of each instruction of a set of encrypted instructions immediately upon the completion of a decryption process, and the providing a next key parameter to the key generator, and generating and loading the next decryption key into another memory bank via a first switch. Then, the first and second operations are repeated.

In another embodiment, a second decryption method for reducing processing latency of stored, encrypted instructions is disclosed. At least one key parameter is provided to a key generator. A first decryption key is generated and loaded into a first memory bank, where such decryption key correspond to the key parameter and comprises a plurality of decryption key characters. A first executing operation is performed in parallel with a first loading operation, wherein the first executing operation comprises the executing of the code of each processor instruction of a set of processor instructions immediately after the code is decrypted by a decryption process, and the first loading operation comprises the providing of a next key parameter to the key generator and the generating and loading of a next decryption key into a second memory bank. A second executing operation is performed in parallel with a second loading operation, wherein the second executing operation comprises the executing of the code of each processor instruction of a set of processor instructions immediately after the code is decrypted by a decryption process, and the second loading operation comprises the providing of a next key parameter to the key generator and the generating and loading of a next decryption key into a first memory bank. Then, the first executing operation and first loading operation are alternately repeated with the second executing operation and second loading operation.

BRIEF DESCRIPTION OF THE DRAWINGS

FIG. 1 depicts a block diagram of a decryption system 100 for reducing processing latency of stored, encrypted instructions.

FIG. 2 depicts an AES input vector and AES key corresponding to an OTP sequence.

DETAILED DESCRIPTION OF THE INVENTION

Figure 3:
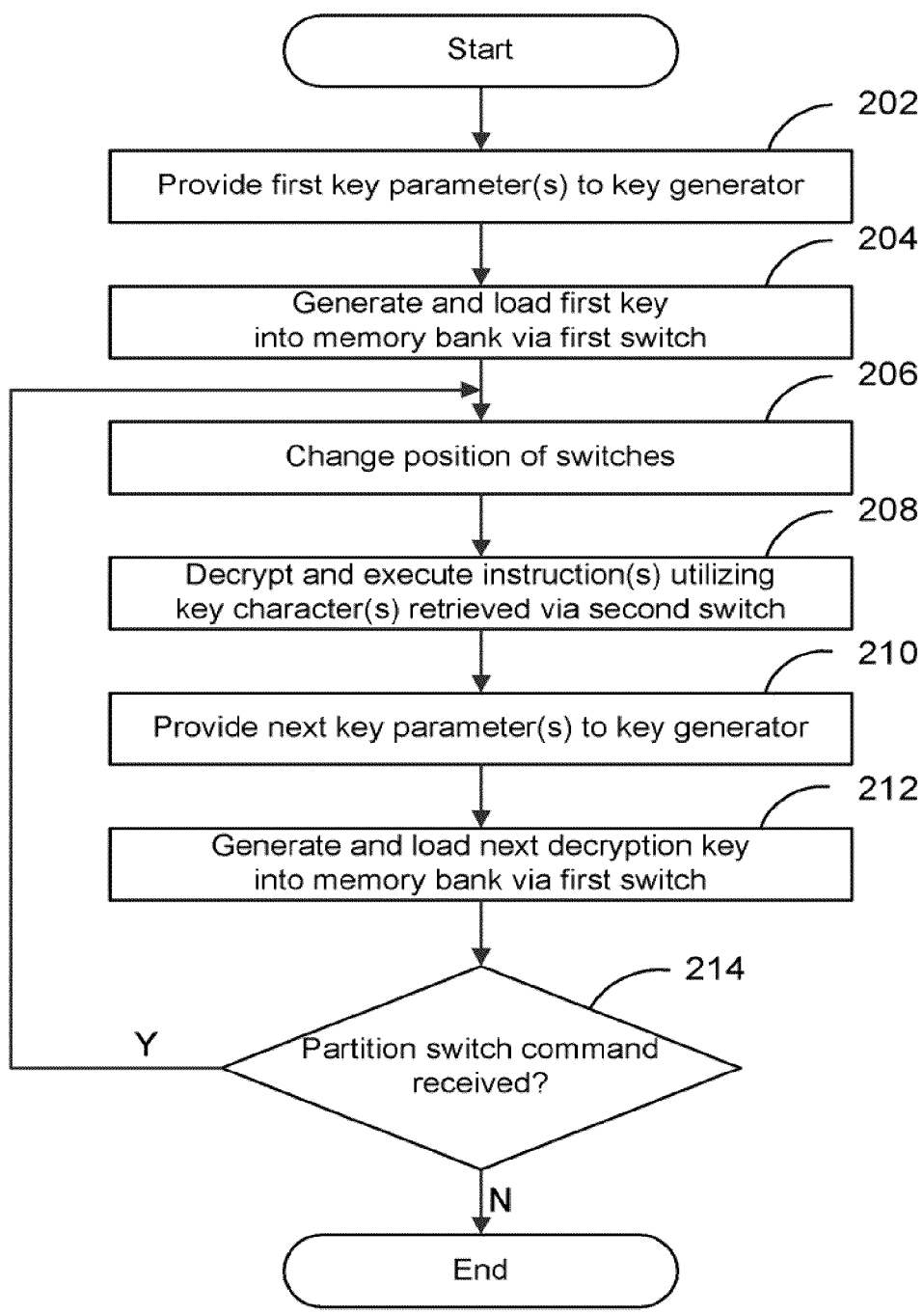
FIG. 3 depicts a flowchart of an exemplary method for reducing processing latency of stored, encrypted instructions The drawings of FIG. 4 illustrate one decryption key being loaded into one memory bank through one switch while another decryption key is simultaneously retrieved from another memory bank through another switch.

In the following description, several specific details are presented to provide a thorough understanding of embodiments of the invention. One skilled in the relevant art will recognize, however, that the invention can be practiced without one or more of the specific details, or in combination with other components, etc. In other instances, well-known implementations or operations are not shown or described in detail to avoid obscuring aspects of various embodiments of the invention.

FIG. 1 depicts a block diagram of a decryption system 100 for reducing processing latency of stored, encrypted instructions suitable for implementation of the techniques described herein. Decryption system 100 could comprise a storage device 110 and a decryption device 120, where such decryption device 120 could comprise a processor 122, combiner 124, memory bank 126, memory bank 128, bus switch B 130, bus switch A 132, key generator 134, and buses switching and decryption key controller 136.

In an embodiment of FIG. 1, the decryption system 100 includes a processor 122 for executing a sequence of encrypted processor instructions read from a storage device 110. Storage device 110 may be comprised of a plurality of storage banks 112-1 through 112-N, each capable of being used in conjunction with a combiner 124 independently and/or congruently. In exemplary embodiments, storage device 110 may be nonvolatile and may include flash memory, magnetic RAM, read-only memory, programmable read-only memory (PROM), erasable PROM, magnetic storage (such as a computer hard disk, a floppy disk drive and magnetic tape), optical disc drives and/or early computer storage methods such as paper tape and punch cards. Additionally, it is contemplated that the external storage element may include volatile memory, including RAM accessible via a combiner 124, such as RAM that is included with a computer linked to an Ethernet connection or the like. In exemplary embodiments, the processor 122 supports Multiple Independent Levels of Security (MILS) or another partitioning scheme Storage device 110 could include a sequence of data including a first set of encrypted instructions stored in storage bank 112-1, a second set of encrypted instructions stored in storage bank 112-2, followed by a third or more sets of encrypted instructions. For example, storage device 110 could include a sequence of instructions comprising executable code and a processor may be partitioned into four partitions. The executable code could include code for executing a first computer program in a first partition of processor 122, code for executing a second computer program in a second partition of processor 122, code for executing a third computer program in a third partition of processor 122, code for executing a fourth computer program in a fourth partition of processor 122. In this example, the first through fourth sets of processor instructions comprise the code for executing the first through fourth computer programs. The number of instructions included in the each set of instructions could be limited by the relative sizes of memory bank 126 and memory bank 128 and depend upon the decryption process employed by combiner 124.

It will be appreciated by those skilled in the art that the sequence of instructions could change at each partition switch of the processor 122, instructions that may be loaded from a wide variety of computer programs. Alternatively, it should be noted that the computer programs as referenced herein may include a variety of executable configurations. For example, in one embodiment, the first and second sets of instructions could represent portions of a process thread, while in another embodiment, the first and second sets of instructions could represent portions of an operating system. However, it will be appreciated by those skilled in the art that these examples are explanatory only, and are not meant to be limiting of the present invention. Thus, the first, second and subsequent sets of instructions may be loaded from a wide variety of executable code sources without departing from the scope and intent of the present invention. Moreover, each set of instructions could correspond to different classification levels as discussed by Bean in U.S. Pat. No. 7,962,727 entitled "MILS Certifiable RAM Paging System." That is, a first set of instructions could correspond to a first classification level and a second set of instructions could correspond to a second classification level, followed by a third or more sets of instructions possibly having yet different classification levels.

In an embodiment of FIG. 1, the combiner 124 may comprise control logic for performing a decryption process, where encrypted code of processor instructions retrieved from the storage device 110 may be decrypted together with characters of the decryption key retrieved from one of a plurality of memory banks 126 and 128 operatively coupled to combiner 124 via a bus switch B 130. Memory bank 126 and memory bank 128 could be configured for storing unique decryption keys generated and loaded from a key generator 134. In an exemplary embodiment, retrieval of both encrypted code of processor instructions stored in storage device 110 and decryption key characters from a memory bank may be initiated from a read command provided by the processor 122. Immediately upon completion of the decryption process performed on the encrypted code of a processor instruction by combiner 124, the decrypted code may be executed by processor 122 operatively coupled to combiner 124. Although many decryption processes may be available, a simple decryption process comprising a combinatory process such as an exclusive-or ("XOR") operation could suffice, thereby minimizing processor execution latency.

Although not illustrated in FIG. 1, an interface could be provided between storage device 110 and combiner 124 for facilitating the retrieval of data from storage device 110. A type of interface that could be employed includes, but is not limited to terminal blocks, crimp-on terminals, insulation displacement connectors, plug-and-socket connectors, component connectors, device connectors, 8P8C connectors, DE-9 connectors, Universal Serial Bus ("USB") connectors, Firewire connectors, wireless connectors, infrared connectors and/or network connectors. In an exemplary embodiment, combiner 124 could include a USB connector of data into combiner connecting to storage device 110.

A key generator 134 may be utilized for generating and loading decryption keys comprising of decryption key characters into one of a plurality of memory banks 126 and 128 operatively coupled to key generator 134 via a bus switch A 132. As embodied herein, the memory bank into which a decryption key is being loaded by a key generator 134 is a separate memory bank from which a combiner 124 is retrieving decryption key character(s) from another decryption key previously generated and loaded by the key generator 134. The process of generating a decryption key by a key generator 134 is discussed in detail below.

The presence of separate memory banks facilitates the simultaneous, independent and/or parallel performance of separate executing and loading operations. For the sole purpose of providing the following illustration and not for the purpose of providing a limitation of the embodiments disclosed herein, processor 122 will be assumed to be partitioned into four partitions. For executing operations, the combiner 124 may be utilized for decrypting a first set instructions (e.g., a first portion of code from a first computer program) retrieved from one or more addresses of storage device 110 together with corresponding first key character(s) retrieved from a memory bank via a bus switch B 130. As embodied herein, a set of instructions could comprise at least one instruction; that is, a set of instructions could comprise one or more instructions. As code for each instruction is retrieved, it may be decrypted by combiner 124 performing a decryption process, thereby allowing processor 122 to execute the code immediately after it has been decrypted. While executing operations are being performed on the first set of instructions, key generator 134 may be utilized in the performance of a loading operation which includes generating and loading of a second encryption key into another memory bank via bus switch A 132. In this manner, the second decryption key is loaded into the memory bank that is a different memory bank from which combiner 124 retrieves one or more first key characters for the decryption process.

Next, processor 122 could perform a partition switch which results with the switch positions of bus switch A 132 and bus switch B 130 being changed. Then, combiner 124 may be utilized for decrypting a second set of instructions (e.g., a second portion of code from a second computer program) retrieved from one or more addresses of storage device 110 together with corresponding second key character(s) retrieved from a memory bank via a bus switch B 130. As code for each instruction is retrieved, it may be decrypted by combiner 124 performing a decryption process, thereby allowing processor 122 to execute the code immediately after it has been decrypted. While these executing operations are being performed, key generator 134 may be utilized in the performance of a loading operation which includes generating and loading of a third encryption key into another memory bank via bus switch A 132. In this manner, the third decryption key is loaded into the memory bank that is a different memory bank from which combiner 124 retrieves one or more second key characters for its decryption process.

Next, processor 122 could perform another partition switch. Then, combiner 124 may be utilized for decrypting a third set of instructions (e.g., a third portion of code from a third computer program) retrieved from one or more addresses of storage device 110 together with corresponding third key character(s) retrieved from a memory bank via a bus switch B 130. As code for each instruction is retrieved, it may be decrypted by combiner 124 performing a decryption process, thereby allowing processor 122 to execute the code immediately after it has been decrypted. While these executing operations are being performed, key generator 134 may be utilized in the performance of a loading operation which includes generating and loading of a fourth encryption key into another memory bank via bus switch A 132. In this manner, the fourth decryption key is loaded into the memory bank that is a different memory bank from which combiner 124 retrieves one or more third key characters for its decryption process.

Next, processor 122 could perform another partition switch. Then, combiner 124 may be utilized for decrypting a fourth set of instructions (e.g., a fourth portion of code from a fourth computer program) retrieved from one or more addresses of storage device 110 together corresponding fourth key character(s) retrieved from a memory bank via a bus switch B 130. As code for each instruction is retrieved, it may be decrypted by combiner 124 performing a decryption process, thereby allowing processor 122 to execute the code immediately after it has been decrypted. While these executing operations are being performed, key generator 134 may be utilized in the performance of a loading operation which includes generating and loading of a fifth encryption key into another memory bank via bus switch A 132. In this manner, the fifth decryption key is loaded into the memory bank that is a different memory bank from which combiner 124 retrieves one or more fourth key characters for its decryption process.

In this fashion, all sets of instructions may be executed in a round-robin fashion by executing a partition switch between each set of instructions. Once the last set of instructions has been switched to, processing could continue back with another first set of instructions. The processor may repeat the above steps until its partition switching is terminated.

In an embodiment of FIG. 1, memory bank 126 and memory bank 128 could comprise, but are not limited to, dynamic RAM, static RAM, content addressable memory, dual-ported RAM, non-volatile RAM, semiconductor memory, and/or early computer storage methods. Memory bank 126 and memory bank 128 are operatively coupled to combiner 124 via a bus switch B 130 to facilitate the retrieval of a decryption key from one of the plurality of memory banks by combiner 124. Also, memory bank 126 and memory bank 128 are operatively coupled to key generator 134 via a bus switch A 132 to facilitate the loading of a decryption key into one of the plurality of memory banks by key generator 134. In another embodiment, the number of memory banks could be more than two as depicted in FIG. 1. As embodied herein, three or more memory banks could be used, where each memory bank may be operatively coupled to a combiner 124 via a bus switch B 130 and a key generator 134 via bus switch A 132.

In an embodiment of FIG. 1, a processor 122 could be a MILS compatible processor such as a processor selected from the Rockwell Collins AAMP processor family. Processor 122 may include any processor capable of intrinsic partitioning thereby allowing it to enforce an explicit communication policy between applications. Processor 122 may be operatively coupled to a combiner 124, thereby allowing processor 122 to execute the code of an instruction after it has been decrypted by combiner 124. In an exemplary embodiment, a processor 122 is a MILS compatible AAMP7 processor.

In an embodiment of FIG. 1, a buses switching and decryption key controller ("controller") 136 could be used for both selecting between the memory banks 126 and 128 and providing one or more key parameters to the key generator 134. Controller 136 could generate a bus control command for changing switch positions of bus switch A 132 and bus switch B 130 to facilitate a simultaneous, independent, and/or parallel retrieval of key character(s) from one memory bank by the combiner 124 and load of another decryption key from another memory bank by key generator 134 during executing and loading operations, respectively. It should be noted that, although FIG. 1 depicts two bus control commands, only one command may be needed to control the position of the plurality of switches. If so, then each switch position may be initialized to a position which facilitates the simultaneous, independent and/or parallel operations.

During loading operations, controller 136 could provide at least one parameter to a key generator 134 for subsequent decryption key generation corresponding to the key parameter(s). Each key parameter could correspond to encryption key that was previously used to encrypt processor instructions stored in the storage device 110. Key parameters could include, but are not limited to, an input vector and/or a key. In an exemplary embodiment of FIG. 2, a 512-bit plaintext input vector ("IV") and a 256-bit AES key could correspond to the previously used encryption key. If a key parameter is not known to the controller 136 prior to the processor 122 sending an initial partition switch command, instructions for initializing each predetermined key parameter may be provided in the controller 136 for a generation of key parameters. That is, the controller 136 could be loaded with prior knowledge of the partition system and sequence of executions encrypted with one or more encryption keys that will be performed by the processor 122.

More than one scheme for encryption may have been utilized prior to storage of encrypted processor instructions, but a simple encryption scheme using a combinatory process could have sufficed. In an exemplary embodiment, processor instructions stored in a storage device 110 could have been encrypted using a one-time pad ("OTP") encryption key together with an exclusive-or operation ("XOR"). The generation of an OTP used in the encryption could have been accomplished using an encryption method, standard, and/or algorithm. For example, the 512-bit plaintext IV and the 256-bit AES key discussed above could be used to seed an AES algorithm in a chaining block cipher mode. Such AES-256 algorithm could be iterated by the key generator 134. After the OTP encryption key had been generated, it could have been subjected to an encryption process comprising the performance of an XOR operation together with the code of the processor instructions. Then, the resulting encrypted processor instructions could have been stored in the storage device 110. It should be noted that, although the preceding discussion has been drawn to seeding an AES-256 encryption standard with a 512-bit plaintext vector and a 256-bit key in a chaining block cipher mode for creating an OTP encryption and decryption keys, the embodiments disclosed herein are not limited to these but could include any method that could be used for creating an OTP.

The advantages and benefits of the embodiments discussed herein may be illustrated using some of the methods that may be employed in a system for decrypting a sequence of data provided by a storage device. In an embodiment of FIG. 3, flowchart 200 provides an exemplary method for reducing processing latency of stored, encrypted instructions. The flowchart begins with module 202 with the providing of one or more key parameters by a controller 136 to a key generator 134. Each key parameter could correspond to an encryption key that was previously used to encrypt processor instructions now stored in the storage device 110, where each encryption key may comprise encryption key characters. As discussed above, key parameters could include, but are not limited to, an input vector and/or a key.

The flowchart continues with module 204 with a generation and loading of a first decryption key into a memory bank via a first switch. As stated above, each key parameter may correspond to a previously-used encryption key. In turn, each key parameter may be used to generate a corresponding decryption key comprising decryption key characters, where each decryption key character may correspond to an encryption key character. In an exemplary embodiment employing an OTP encryption scheme, each IV and key may correspond to a unique OTP decryption key, where the OTP decryption key may be the same as the OTP encryption key corresponding to the IV and key. Each IV and a key could be used to seed an AES algorithm in a chaining block cipher mode. The AES-256 algorithm could be iterated by the key generator 134 in the generation of the decryption key.

Figure 4A:
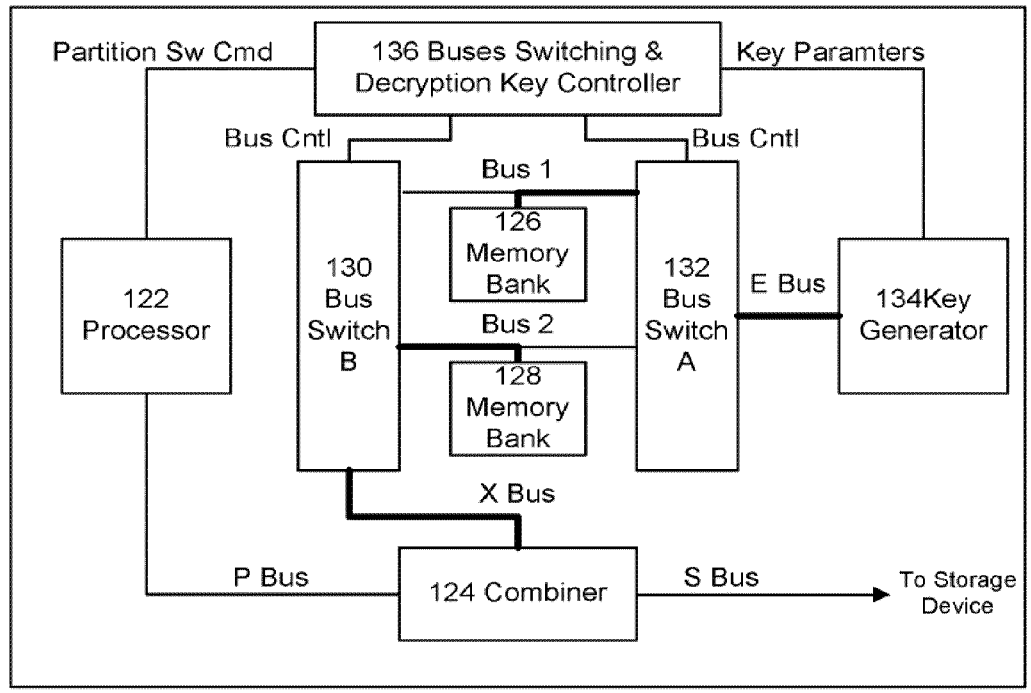

FIG. 4A illustrates how a first decryption key could be loaded into a memory bank through a first switch. For the purpose of discussion only, the position of bus switch A 132 will facilitate the transfer of the key into memory bank 126. As indicated by the thick lines of E Bus and Bus 1 depicted in FIG. 4A, the first decryption key could be loaded into memory bank 126 via bus switch A 132.

Returning to FIG. 3, the flowchart continues with module 206 with a switching of memory banks. This operation could be performed upon receiving a partition switch command provided by the processor 122. Once received, the controller 136 could provide bus control command to bus switch A 132 and bus switch B 130.

Figure 4B:
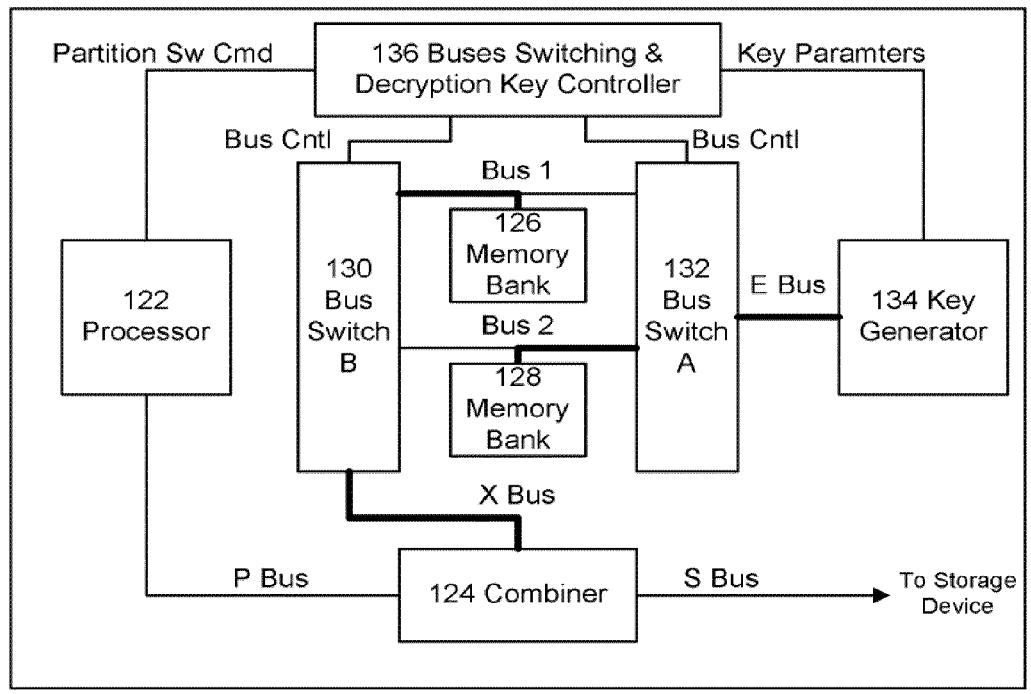

FIG. 4B illustrates the resultant couplings after a first bus control command is provided by controller 136 to bus switch A 132 and bus switch B 130. When compared with FIG. 4A, memory bank 126 and memory bank 128 shown in FIG. 4B are coupled to different switches as illustrated by the thick lines. The position of bus switch A 132 operatively couples key generator 134 with memory bank 128 via E Bus and Bus 2. Likewise, the position of bus switch B 130 operatively couples memory bank 126 with combiner 124 via Bus 1 and X Bus. In these positions, bus switch B 130 will facilitate the transfer of one or more decryption key characters between memory bank 126 and a combiner 124 while bus switch A 132 will facilitate the transfer a next key between key generator 134 and memory bank 128.

Returning to FIG. 3, the flowchart continues with module 208 with the executing of code of each instruction of a set of processor instructions, where the code is executed immediately after being decrypted by a decryption process by the combiner 124. As stated above, a set of instructions could comprise at least one instruction; that is, a set of instructions could comprise one or more instructions.

As embodied herein, a decryption process could include retrieving of encrypted code for one instruction from a set of encrypted processor instructions previously-encrypted with the encryption key from which the decryption key parameter was generated in module 202. The decryption process could also include the retrieving a decryption key character via the second switch as indicated by the thick lines of Bus 1 and X Bus depicted in FIG. 4B. Each decryption key character could correspond to an encryption key character previously-used to encrypt the code of the instruction. With the retrievals of the code and decryption key character, decryption may be accomplished through a combinatorial process.

In an exemplary embodiment, the decryption process could comprise an XOR operation, and the decryption key from which a decryption key character is retrieved could be an OTP. Because an XOR operation is a combinatory process of an instruction, latency of processor execution of encrypted data read from a storage device 110 has been significantly reduced. Code of each processor instruction may be immediately executed upon the completion of the decryption process of the encrypted code of each instruction.

Returning to FIG. 3, the flowchart continues with module 210 with a providing of the next one or more key parameters to the key generator 134. This operation could be performed upon receiving a partition switch command provided by a processor 122 and in parallel with modules 206 and/or 208.

Once received, a controller 136 could provide the sequentially next key parameter(s) to a key generator in the same manner as discussed for the first key parameter(s) in module 202.

The flowchart continues with module 212 with a generation and loading of a sequentially next decryption key into a memory bank via a first switch. This operation could be performed upon receiving the next key parameter(s) provided by the controller 136 and in parallel with module 208. The key generator 134 could generate and load the next decryption key in the same manner as discussed for the first decryption key in module 204.

FIG. 4B illustrates how the next decryption key could be loaded into a memory bank through a first switch. As indicated by the thick lines of E Bus and Bus 2, the next decryption key could be loaded into memory bank 128 via Bus Switch A 132, a different memory bank from the previous load of a decryption key.

Returning to FIG. 3, the flowchart continues with module 214 with a repeating of modules 206 through 212, inclusive, where a next partition switch command has been provided by processor 122 and received by controller 136. If no partition switch command has been provided, then the flowchart proceeds to the end.

Figure 5:
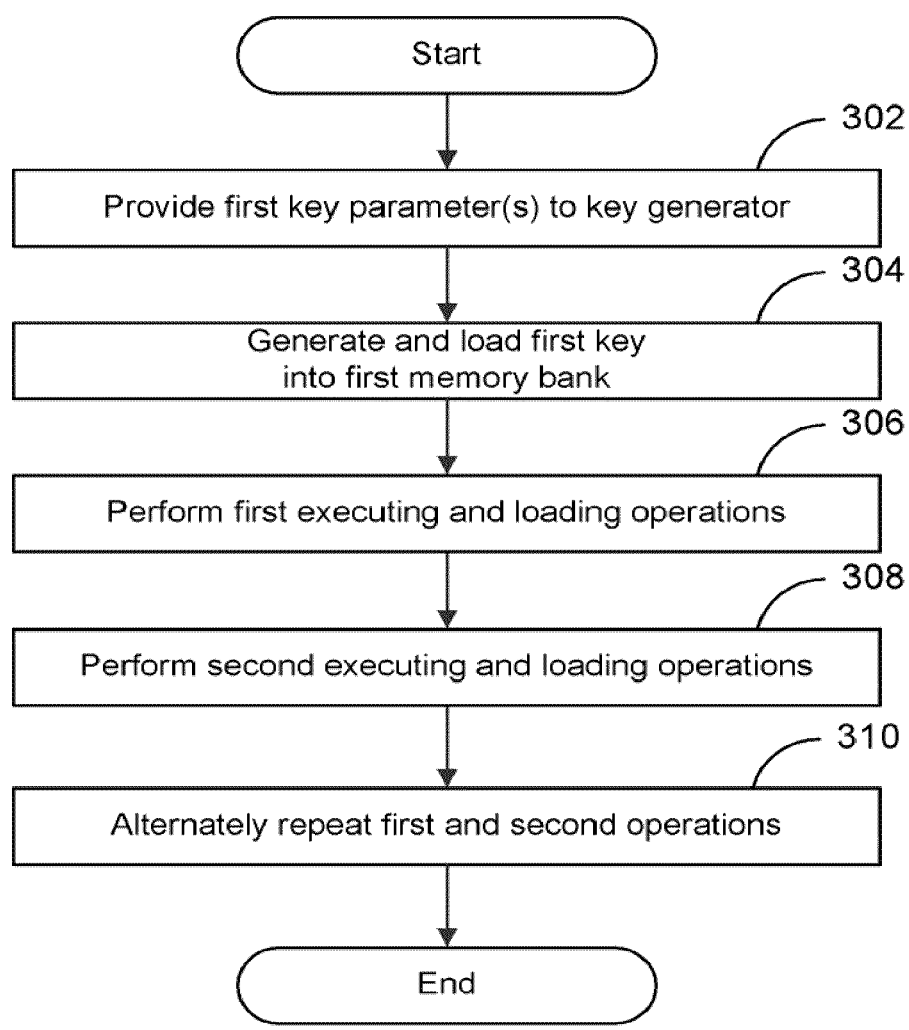
FIG. 5 depicts a flowchart of a second exemplary method for reducing processing latency of stored, encrypted instructions.

In an embodiment of FIG. 5, flowchart 300 provides another exemplary method for reducing processing latency of stored, encrypted instructions. The flowchart begins with module 302 with the providing of one or more key parameters by a controller 136 to key generator 134. This may be accomplished in the same manner as was discussed above for module 202.

The flowchart continues with module 304 with a generation and loading of a first decryption key into a first memory bank, where the generation of the first decryption key may be accomplished in the same manner as was discussed above for module 204. FIG. 4A illustrates how a first decryption key could be loaded into the first memory bank. For the purpose of discussion only, the position of bus switch A 132 will facilitate the loading of the decryption key into the first memory bank designated as memory bank 126. As indicated by the thick lines of E Bus and Bus 1 depicted in FIG. 4A, the first decryption key could be loaded into memory bank 126.

Returning to FIG. 5, the flowchart continues with module 306 with a simultaneous performing of an executing operation and a loading operation upon receipt of respective commands. That is, the executing operation may be performed in parallel with the loading operation upon respective commands. Upon partition switch by processor 122, one command (e.g., read command) may initiate the execution operation while another command (e.g., partition switch command) may initiate the loading operation at the same time, where both commands are issued by the processor 122. Immediately upon receiving the partition switch command the controller 136 may initiate bus switch commands and the providing of one or more key parameters to a load generator.

The execution operation could comprise executing code of each instruction of a set of processor instructions, where the code is executed immediately after being decrypted by a decryption process by combiner 124. As embodied herein, a decryption process could include retrieving encrypted code of one instruction from a set of encrypted processor instructions previously-encrypted with the encryption key from which the decryption key parameter was generated in module 202. The decryption process could also include the retrieving of a decryption key character via the first memory bank as indicated by the thick lines of Bus 1 and X Bus depicted in FIG. 4B. Each decryption key character could correspond to an encryption key character previously-used to encrypt the code of the instruction. With the retrievals of the code and decryption key character, decryption may be accomplished through a combinatorial process.

In an exemplary embodiment, the decryption process could comprise an XOR operation, and the decryption key could be an OTP. Because an XOR operation is a combinatory process, latency of processor execution of encrypted data read from the storage device 110 has been reduced. Code of each processor instruction may be immediately executed upon the completion of the decryption process of the encrypted code of each instruction.

The loading operation could comprise providing of the next one or more key parameters to the key generator 134. The controller 136 could provide the sequentially next key parameter(s) to a key generator in the same manner as discussed for the first key parameter(s) in module 302.

The loading operation could also comprise generating and loading of a sequentially next decryption key into a second memory bank, where the generation of the next decryption key may be accomplished in the same manner as was discussed above in module 304 for the first decryption key. FIG. 4B illustrates how the next decryption key could be loaded into the second memory bank designated as memory bank 128. As indicated by the thick lines of E Bus and Bus 2 depicted in FIG. 4B, the next decryption key could be loaded into memory bank 128.

Returning to FIG. 5, the flowchart continues with module 308 with a simultaneous performing of a second executing operation and a second loading operation upon receipt of respective commands. That is, the second executing operation may be performed in parallel with the second loading operation upon respective commands. Upon partition switch by the processor 122, one command (e.g., read command) may initiate the execution operation while another command (e.g., partition switch command) may initiate the second loading operation at the same time, where both commands are issued by the processor 122. Immediately upon receiving the partition switch command the controller 136 may initiate bus switch commands and the providing of one or more key parameters to a load generator.

The second execution operation could comprise executing code of each instruction of a set of processor instructions, where the code is executed immediately after being decrypted by a decryption process by the combiner 124. As embodied herein, a decryption process could include retrieving encrypted code of one instruction from a set of encrypted processor instructions previously-encrypted with the encryption key from which the decryption key parameter was generated in module 302. The decryption process could also include the retrieving a decryption key character via the second memory bank as indicated by the thick lines of Bus 2 and X Bus depicted in FIG. 4A. Each decryption key character could correspond to an encryption key character previously-used to encrypt the code of the instruction. With the retrievals of the code and decryption key character, decryption may be accomplished through a combinatorial process.

In an exemplary embodiment, the decryption process could comprise an XOR operation, and the decryption key could be an OTP. Because an XOR operation is a combinatory process, latency of processor execution of encrypted data read from the storage device 110 has been reduced. Code of each processor instruction may be immediately executed upon the completion of the decryption process of the encrypted code of each instruction.

The second loading operation could comprise providing of the next one or more key parameters to the key generator 134. The controller 136 could provide the sequentially next key parameter(s) to a key generator in the same manner as discussed for the first key parameter(s) in module 302.

The second loading operation could also comprise generating and loading of a sequentially next decryption key into the first memory bank, where the generation of the next decryption key may be accomplished in the same manner as was discussed above in module 304 for the first decryption key. FIG. 4A illustrates how the next decryption key could be loaded into the first memory bank designated as memory bank 126. As indicated by the thick lines of E Bus and Bus 1 depicted in FIG. 4A, the next decryption key could be loaded into memory bank 126.

Returning to FIG. 5, the flowchart continues with module 310 with alternately repeating of modules 306 through 308 upon successive partition switches of processor 122. If processor 122 switches partitions after the performance of module 308, then module 306 will be performed next; if processor 122 switches partitions after the performance of module 306, then module 308 will be performed next. The alternate performances of modules 306 and 308 may continue to repeat until processor 122 ceases to switch partitions. Then, the flowchart proceeds to the end.

It should be noted that the method steps described above may be embodied in computer-readable media as computer instruction code. It shall be appreciated to those skilled in the art that not all method steps described must be performed, nor must they be performed in the order stated.

As used herein, the term "embodiment" means an embodiment that serves to illustrate by way of example but not limitation.

It will be appreciated to those skilled in the art that the preceding examples and embodiments are exemplary and not limiting to the scope of the present invention. It is intended that all permutations, enhancements, equivalents, and improvements thereto that are apparent to those skilled in the art upon a reading of the specification and a study of the drawings are included within the true spirit and scope of the present invention. It is therefore intended that the following appended claims include all such modifications, permutations and equivalents as fall within the true spirit and scope of the present invention.

What is claimed is:

1. A decryption system for reducing processing latency of stored, encrypted instructions, said system comprising:
   a storage device configured to store a plurality of sets of encrypted processor instructions, wherein
      each set of encrypted processor instructions was encrypted using a corresponding encryption key;
   a processor configured to
      switch between a plurality of partitions,
      generate a switch command upon switching between the plurality of partitions,
      generate a read command upon switching between the plurality of partitions, and
      execute decrypted code;
   a controller, operatively coupled to the processor, wherein the controller is configured to
      receive switch commands from the processor,
      generate bus switch commands, and
      provide sequential key parameters to a key generator, where
         each key parameter corresponds to an encryption key previously used for encrypting processor instructions, where
            the encryption key is comprised of a plurality of encryption key characters;
   the key generator, operatively coupled to the controller, wherein the key generator is configured to
      receive the plurality of sequential key parameters from the controller,
      generate a plurality of decryption keys, where
         each decryption key corresponds to a key parameter and is comprised of a plurality of decryption key characters, where
            each decryption key character corresponds to an encryption key character, and
         load each decryption key into a memory bank via a first bus switch;
   a plurality of memory banks, each memory bank operatively coupled to both the key generator through the first bus switch and a combiner through a second bus switch, where
      each memory bank is alternately loaded with one decryption key from the key generator;
   the first bus switch, operatively coupled to the controller, wherein the first bus switch is configured to
      receive a first bus switch command from the controller, and
      change position from one memory bank to another memory bank in response to the first bus switch command to facilitate a loading of a decryption key into the latter memory bank by the key generator;
   the second bus switch, operatively coupled to the controller, wherein the second bus switch is configured to
      receive a second bus switch command from the controller, and
      change position from one memory bank to another memory bank in response to the second bus switch command to facilitate a retrieval of at least one decryption key character from the latter memory bank by the combiner; and
   the combiner, operatively coupled to the second bus switch, the storage device, and the processor, wherein the combiner is configured to
      perform a decryption process on the encrypted code of each instruction of a set of encrypted processor instructions, whereby
         the resulting decrypted code is executed immediately by the processor after being decrypted.

2. The system of claim 1, wherein the controller is further configured to initialize predetermined instructions for key parameter generation.

3. The system of claim 1, wherein each set of encrypted processor instructions was previously-encrypted utilizing an OTP and an exclusive-or operation.

4. The system of claim 1, wherein each encryption key and decryption key corresponds to an OTP.

5. The system of claim 1, wherein
   the decryption process is comprised of
      retrieving encrypted code of an instruction from a set of encrypted processor instructions,
      retrieving a decryption key character from a memory bank, where the decryption key character corresponds to an encryption key character associated with the encrypted code, and
      decrypting the encrypted code utilizing the retrieved decryption key character.

6. The system of claim 5, wherein the decryption process includes an exclusive-or operation.

7. The system of claim 1, wherein the processor is an advanced architecture microprocessor.

8. The system of claim 1, wherein the combiner and processor execution of decrypted instructions operate in parallel with the key generator.

9. A decryption method for reducing processing latency of stored, encrypted instructions, said method comprising:
providing at least one first key parameter to a key generator, where
each key parameter corresponds to an encryption key previously used for encrypting processor instructions;
generating and loading a first decryption key into a memory bank via a first switch, where
each decryption key corresponds to a key parameter and is comprised of a plurality of decryption key characters;
performing a first operation, wherein
the first operation is comprised of
changing the position of a second switch from one memory bank to another memory bank to facilitate a retrieval of at least one decryption key character from the latter memory bank by a combiner, and
changing the position of the first switch from one memory bank to another memory bank to facilitate the loading of a decryption key into the latter memory bank by a key generator;
performing a second operation, wherein
the second operation is comprised of
executing code immediately after the code has been decrypted by a decryption process, where
the decryption process is performed on encrypted code of an instruction of a set of encrypted processor instructions,
providing a next key parameter to the key generator, and
generating and loading a next decryption key via the first switch; and
repeating the performance of the first operation and the second operation.

10. The method of claim 9, further comprising:
initializing predetermined instructions for key parameter generation.

11. The method of claim 9, wherein each set of encrypted processor instructions was previously-encrypted utilizing an OTP and an exclusive-or operation.

12. The method of claim 9, wherein each encryption key and decryption key corresponds to an OTP.

13. The method of claim 9, wherein
the decryption process is comprised of
retrieving encrypted code of an instruction from a set of encrypted processor instructions,
retrieving a decryption key character from a memory bank, where
the decryption key character corresponds to an encryption key character associated with the encrypted code, and
decrypting the encrypted code utilizing the retrieved decryption key character.

14. The method of claim 13, wherein the decryption process is comprised of an exclusive-or operation.

15. A decryption method for reducing processing latency of stored, encrypted instructions, said method comprising:
providing at least one first key parameter to a key generator, where
each key parameter corresponds to an encryption key previously used for encrypting processor instructions;
generating and loading a first decryption key into a first memory bank, where
each decryption key corresponds to a key parameter and is comprised of a plurality of decryption key characters;
performing a first executing operation in parallel with a first loading operation upon a switch of partitions, wherein
the first executing operation and first loading operation is comprised of
executing code immediately after the code has been decrypted by a decryption process, where
the decryption process is performed on encrypted code of an instruction of a set of encrypted processor instructions,
providing a next key parameter to the key generator, and
generating and loading a next decryption key into a second memory bank;
performing a second executing operation in parallel with a second loading operation upon a switch of partitions, wherein
the second executing operation and second loading operation is comprised of
executing code immediately after the code has been decrypted by a decryption process, where
the decryption process is performed on encrypted code of an instruction of a set of encrypted processor instructions,
providing a next key parameter to the key generator, and
generating and loading a next decryption key into the first memory bank; and
alternately repeating the performance of the first executing operation and first loading operation with the second executing operation and second loading operation.

16. The method of claim 15, further comprising: initializing predetermined instructions for key parameter generation.

17. The method of claim 15, wherein each set of encrypted processor instructions was previously-encrypted utilizing an OTP and an exclusive-or operation.

18. The method of claim 15, wherein each encryption key and decryption key corresponds to an OTP.

19. The method of claim 15, wherein the decryption process is comprised of
retrieving encrypted code of an instruction from a set of encrypted processor instructions,
retrieving a decryption key character from a memory bank, where
the decryption key character corresponds to an encryption key character associated with the encrypted code, and
decrypting the encrypted code utilizing the retrieved decryption key character.

20. The method of claim 19, wherein the decryption process is comprised of an exclusive-or operation.

* * * * *